US012368999B2

(12) United States Patent
Yonglei et al.

(10) Patent No.: US 12,368,999 B2
(45) Date of Patent: Jul. 22, 2025

(54) HIGH AMPLITUDE MICRO LOUDSPEAKER WITH A DOUBLE SUSPENSION FRAME

(71) Applicant: BESTAR HOLDING CO., LTD., Jiangsu (CN)

(72) Inventors: Zhang Yonglei, Changzhou (CN); Ren Jiangfeng, Changzhou (CN); Wu Yifei, Changzhou (CN)

(73) Assignee: BESTAR HOLDING CO., LTD., Changzhou (CN)

( * ) Notice: Subject to any disclaimer, the term of this patent is extended or adjusted under 35 U.S.C. 154(b) by 274 days.

(21) Appl. No.: 17/967,558

(22) Filed: Oct. 17, 2022

(65) Prior Publication Data

US 2023/0217182 A1 Jul. 6, 2023

Related U.S. Application Data

(60) Provisional application No. 63/296,639, filed on Jan. 5, 2022.

(51) Int. Cl.

| | |
|---|---|
| ***H04R 9/06*** | (2006.01) |
| ***H04R 7/16*** | (2006.01) |
| ***H04R 9/02*** | (2006.01) |
| ***H04R 9/04*** | (2006.01) |

(52) U.S. Cl.

CPC ................. *H04R 9/06* (2013.01); *H04R 7/16* (2013.01); *H04R 9/025* (2013.01); *H04R 9/046* (2013.01)

(58) Field of Classification Search

CPC . H04R 9/06; H04R 7/16; H04R 9/025; H04R 9/046; H04R 2400/11; H04R 2499/11; H04R 7/20; H04R 7/04; H04R 9/043; H04R 9/045; H04R 7/127; H04R 7/10

See application file for complete search history.

(56) References Cited

U.S. PATENT DOCUMENTS

| | | | | |
|---|---|---|---|---|
| 10,034,095 B2 * | 7/2018 | Mao | ........................ | H04R 7/127 |
| 10,299,045 B2 * | 5/2019 | Xiao | ........................ | H04R 7/10 |
| 2020/0045445 A1 * | 2/2020 | Feng | ........................ | H04R 9/06 |
| 2020/0045453 A1 * | 2/2020 | Xiao | ........................ | H04R 9/06 |
| 2020/0208621 A1 * | 7/2020 | Liu | ........................ | H02M 7/48 |

FOREIGN PATENT DOCUMENTS

| | | |
|---|---|---|
| CN | 103414985 A | 11/2013 |

* cited by examiner

*Primary Examiner* — Angelica M McKinney

(74) *Attorney, Agent, or Firm* — Wood, Phillips, Katz, Clark & Mortimer

(57) ABSTRACT

There is disclosed herein a high amplitude micro loudspeaker comprising a magnet circuit, comprised by a magnet of a select size and shape mounted to a back plate. A voice coil is of a size and shape to be sleeved about the magnet. A speaker frame is operatively secured to the back plate around a periphery of the magnet to define a space therebetween for receiving the voice coil. Front and rear suspension components are respectively secured to a front and rear of the voice coil and to a front and rear of the speaker frame whereby the voice coil is supported so that it is suspended and sleeved about the magnet. A diaphragm assembly is secured to the front of the speaker frame and the front of the voice coil.

19 Claims, 5 Drawing Sheets

HIGH AMPLITUDE MICRO LOUDSPEAKER WITH A DOUBLE SUSPENSION FRAME

BACKGROUND OF THE INVENTION

Field of the Invention

The invention relates to the technical field of acoustics, in particular to a high amplitude micro loudspeaker with a double suspension frame.

Background Art

Standard loudspeakers fill a large variety of applications and vary from less than 20 mm sizes all the way up to large sub-woofers. Micro loudspeakers, also referred to as micro speakers, are mostly used in mobile communication devices, such as mobile phones and tablet devices, and any handheld devices needing voice quality sound. The International Electrotechnical Commission in the IEC 63034 standard defines a micro speaker as a loudspeaker in which the radiating element, such as a diaphragm, is not greater than 40 mm.

As an important electroacoustic transducer in electronic products, the lightweight development of electronic products puts forward higher requirements on the volume and sound effect of loudspeakers. The specific requirements are smaller volume of loudspeaker and better bass effect.

In current speaker technology, large magnets and large voice coils are usually used to obtain better bass effect. However, this increases the volume of the loudspeaker. Due to the limitation of structure and space, some lightweight electronic products cannot provide a suitable assembly space for the loudspeaker with increased volume, which further leads to low sound pressure and low power of the loudspeaker. The increase of sound pressure and power inevitably requires the increase of diaphragm amplitude. The accompanying problem is the increase of vibration system weight, while the lightweight development of electronic products has a need to reduce the vibration system of loudspeakers.

The present application describes solutions to the above problems in a novel and simple manner.

SUMMARY OF THE INVENTION

In accordance with the invention a high amplitude micro loudspeaker includes a double suspension frame.

In accordance with the invention, there is disclosed herein a high amplitude micro loudspeaker comprising a magnet circuit, comprised by a magnet of a select size and shape mounted to a back plate. A voice coil is of a size and shape to be sleeved about the magnet. A speaker frame is operatively secured to the back plate around a periphery of the magnet to define a space therebetween for receiving the voice coil. Front and rear suspension components are respectively secured to a front and rear of the voice coil and to a front and rear of the speaker frame whereby the voice coil is supported so that it is suspended and sleeved about the magnet. A diaphragm assembly is secured to the front of the speaker frame and the front of the voice coil.

It is a feature that the front and rear suspension components are arranged in parallel, and the front and rear suspension components are fixedly connected with both ends of the voice coil.

It is another feature that the front suspension component is disposed between the diaphragm assembly and the voice coil, and the front suspension component comprises two sides fixedly connected with the diaphragm assembly and a front side of the voice coil, and the rear suspension component is fixedly connected with a rear side of the voice coil towards the back plate.

Further, depth of the speaker frame may be the same as depth of the voice coil, and wherein the front and rear suspension components are fixedly connected with front and rear sides of the speaker frame.

The front suspension component comprises an outer ring frame, an inner ring frame and front suspension arms connected between the outer ring frame and the inner ring frame and are arranged on the same horizontal plane, and wherein the outer ring frame and the inner ring frame are respectively arranged corresponding to the speaker frame and the voice coil.

Further, the rear suspension components comprise first and second suspension elements symmetrically arranged on opposite ends of the voice coil, and wherein each of the first and second suspension elements comprises an outer support plate, an inner support plate and rear suspension arms connected between the outer support plate and the inner support plate and which are arranged in the same horizontal plane, and wherein the outer support plate and the inner support plate are respectively arranged corresponding to the speaker frame and the voice coil.

Further, the outer ring frame and the outer support plate are respectively secured to front and rear surfaces of the speaker frame, and wherein the inner ring frame and the first and second suspension element inner support plates are secured to the rear surface of the voice coil.

The diaphragm assembly may comprise a diaphragm or dome in a middle part, a folding ring arranged around the dome, and an outer diaphragm flange arranged around the folding ring, and wherein the diaphragm assembly is fixedly connected to the front suspension component and the folding ring is located above the front suspension arms, and the diaphragm and the outer diaphragm flange are respectively connected to the inner ring frame and the outer ring frame.

Further, the diaphragm assembly may comprise a middle sticker arranged on the diaphragm.

Further, the magnet comprises a main magnet of a generally rectangular shape corresponding to the voice coil, and wherein the magnet circuit further comprises first and second sub magnets symmetrically arranged on both sides of the main magnet.

The micro loudspeaker may further comprise a front plate embedded in a ring groove opened in an inner wall of the speaker frame, and wherein the front plate is provided with a pressing plate along each side corresponding to the first and second sub magnets, and the pressing plates are fixedly connected with the side of the sub magnets facing the diaphragm assembly.

Further, the voice coil is arranged in a rectangular tube shape as a whole, including a coil arranged around its axial direction.

Further, the magnet comprises a main magnet of a generally rectangular shape corresponding to the voice coil, and wherein the magnet circuit further comprises first and second sub magnets symmetrically arranged on both sides of the main magnet, and the first and second suspension elements are symmetrically arranged on opposite short ends of the main magnet.

The beneficial effects of the invention are that in the invention, the suspension component is arranged on the front and rear faces of the voice coil, so that the suspension component can fully support the weight of the voice coil and avoid auxiliary suspension relying on the diaphragm assembly, and enable the diaphragm in the voice film assembly to give full play to the maximum acoustic performance.

By setting the front suspension component and the rear suspension components to support the voice coil, the design quality of the voice coil can be increased, the thickness of the voice film can be reduced, the minimum resonance frequency can be reduced, and the low-frequency amplitude can be increased at the same time. Further realize the miniaturization design of loudspeaker and improve the demand of bass effect.

Further features and advantages will be readily apparent from the specification and the drawings.

DETAILED DESCRIPTION OF THE INVENTION

The invention is described below in combination with the accompanying drawings which illustrate the embodiments of the invention. The described embodiments are illustrative of the invention but are not limiting.

In order to explain the embodiments of the invention or the technical solutions more clearly, the following will briefly introduce the drawings to be used in the description of embodiments or existing technologies. It is obvious that the drawings in the following description are only some embodiments of in the invention. For ordinary technicians in this field, other drawings can also be obtained from these drawings without creative labor.

It should be noted that when an element is called "fixed to" another element, it can be directly on another element or there can be an intermediate element. When an element is considered to be "connected" to another element, it can be directly connected to another element or there may be intermediate elements at the same time. The terms "vertical". "horizontal", "left", "right" and similar expressions used herein are for illustrative purposes only and do not mean that they are the only embodiments. The relative terms "upper" and "lower" or "top" and "bottom" are used relative to the orientation of the loudspeaker as shown in FIG. 1.

Unless otherwise defined, all technical and scientific terms used herein have the same meanings as those generally understood by those skilled in the technical field of the present invention. The terms used in the description of the invention herein are only for the purpose of describing specific embodiments and are not intended to limit the invention. The term "and/or" as used herein includes any and all combinations of one or more related listed items.

Figure 1:
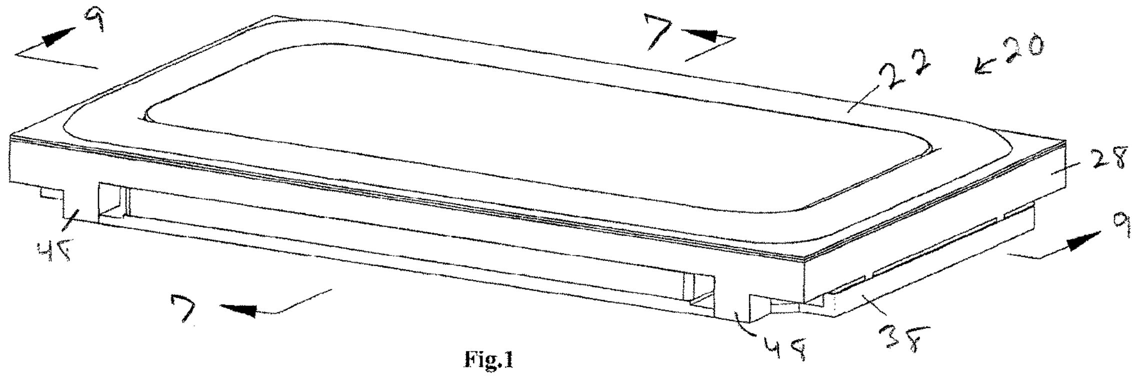
FIG. 1 is a perspective view of a high amplitude micro loudspeaker in an embodiment of the present invention.
Figure 2:
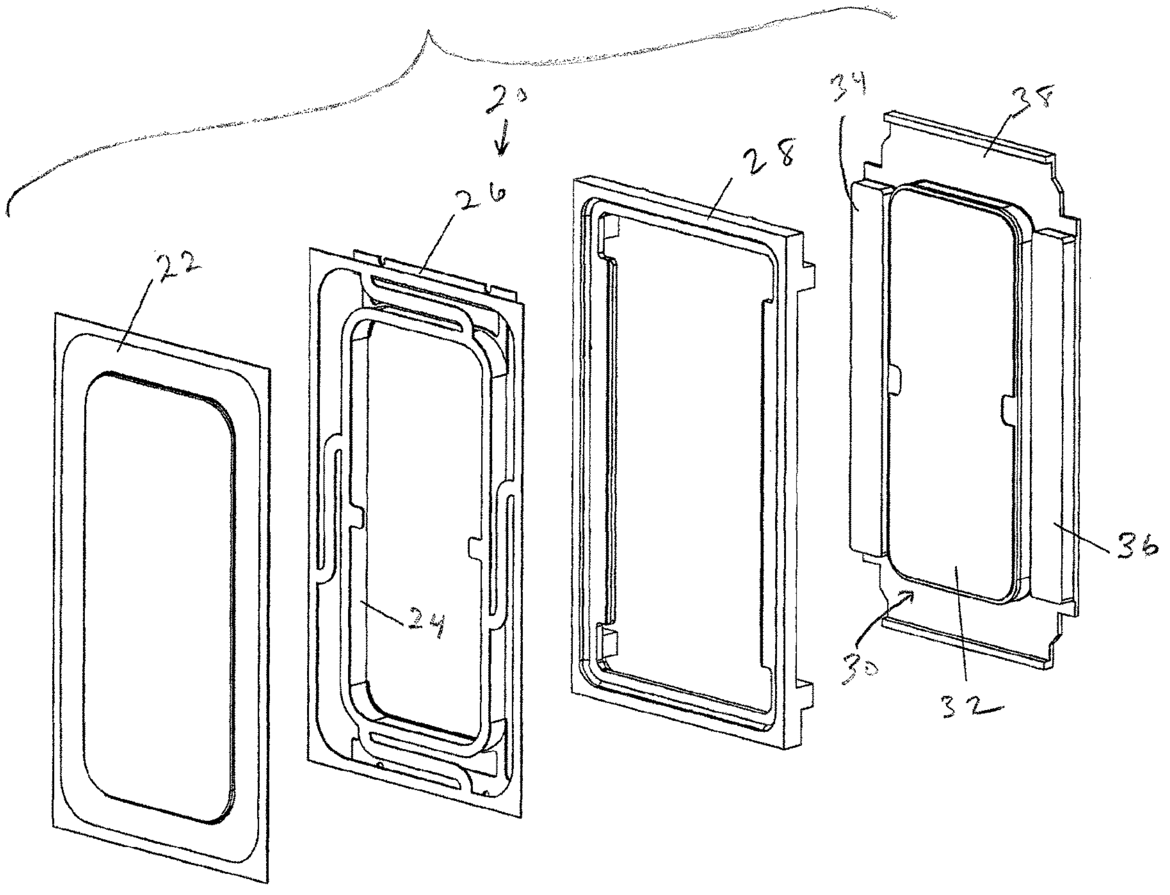
FIG. 2 is an exploded diagram of the micro loudspeaker of FIG. 1.

As shown in FIGS. 1 and 2, a high amplitude micro loudspeaker 20 with double suspension frame comprises a diaphragm assembly 22, a voice coil 24, a double suspension frame 26, a speaker frame 28, and a magnetic circuit 30 comprising a main magnet 32 and sub magnets 34 and 36 mounted to a back plate 38.

The diaphragm assembly 22 is fixed on an upper face of the speaker frame 28, the voice coil 24 is connected with the diaphragm assembly 22 and suspended on the main magnet 32 through the support of the double suspension frame 26. The double suspension frame 26 is fixed on the speaker frame 28, and a rear side of the speaker frame 28, away from the diaphragm assembly 22, is fixed on the back plate 38. The main magnet 32 is fixed on the upper surface of the back plate 38 facing the diaphragm assembly 22, and the sub magnets 34 and 36 are symmetrically arranged on both sides of the main magnet 32.

In order to solve the technical bottleneck in current techniques that micro loudspeakers cannot meet the lightweight design of electronic products and improve the bass effect at the same time, the loudspeaker structure described and illustrated herein is provided with the double suspension frame 26 to realize the miniaturization of the speaker, reduce the minimum resonance frequency and increase the low-frequency amplitude, and improve the sound pressure and power of the loudspeaker under the same volume.

Figure 3:
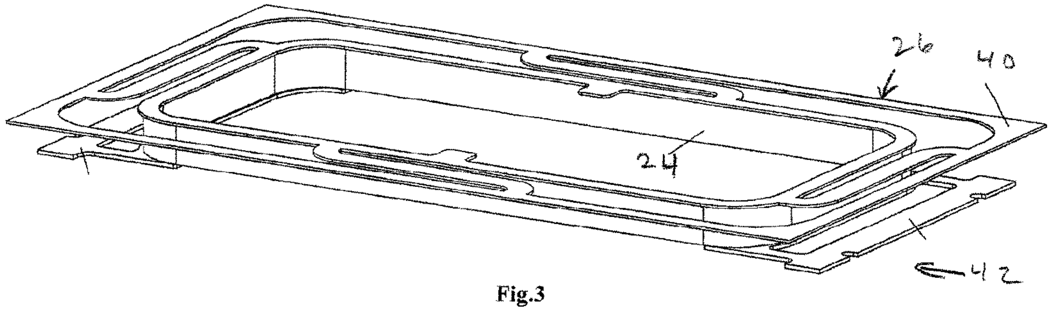
FIG. 3 is a perspective view of a voice coil on the suspension component of the micro loudspeaker of FIG. 1.
Figure 4:
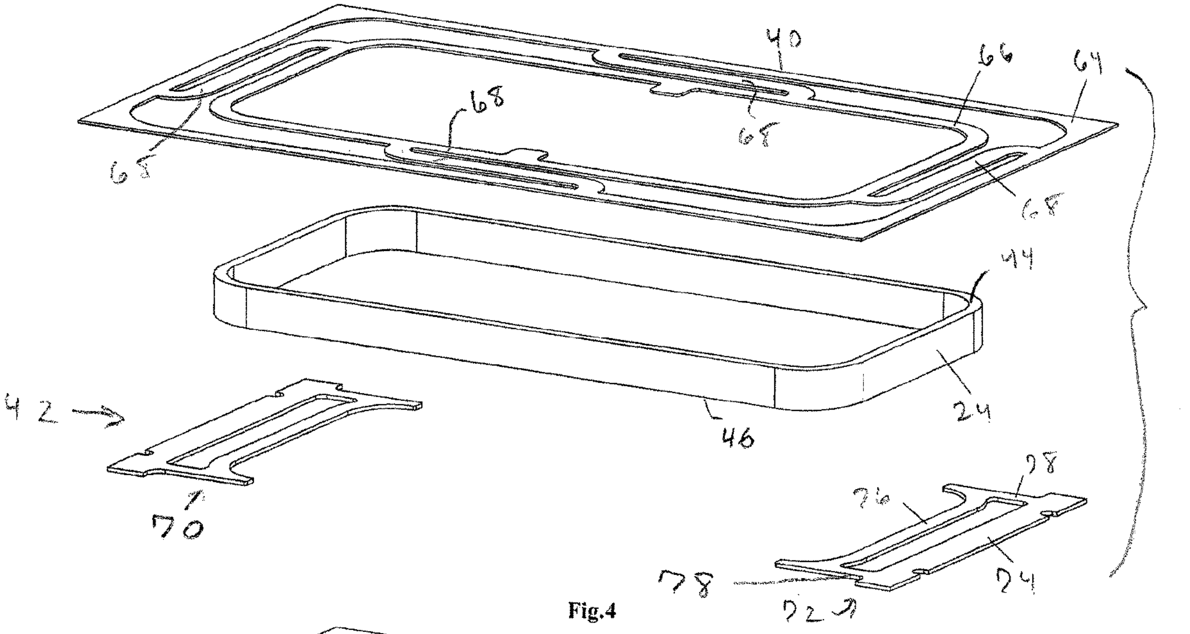
FIG. 4 is an exploded view of FIG. 3.

Specifically, and with reference to FIGS. 3 and 4, the double suspension frame 26 comprises front and rear suspension components 40 and 42, respectively secured to a front surface 44 and a rear surface 46 of the voice coil 24. As a result, the design weight of the voice coil 24 can be increased while avoiding the auxiliary support of the voice coil 24 relying on the diaphragm assembly 22, which could reduce the acoustic performance of the diaphragm assembly 22. The design of the front suspension component 40 and the rear suspension component 42 can give full play to the maximum acoustic performance of the diaphragm assembly 22. The diaphragm assembly 22 can also be thinned, and the low-frequency amplitude can be further increased by reducing the minimum low-frequency amplitude, so as to improve the bass effect.

The double suspension frame 26 may be formed, for example, of a polyimide material such as Kapton or other similar polymers. The double suspension frame 26 includes the front suspension component 40 and the rear suspension component 42 arranged in parallel. The front suspension component 40 and the rear suspension component 42 are fixedly connected with the voice coil 24 as discussed.

The main magnet 32 is of a generally rectangular shape with rounded corners and has a size corresponding to the voice coil 24 which is sleeved about the main magnet 32. The first and second sub magnets 34 and 36 are symmetrically arranged on both sides of the main magnet 32 to the outside of the voice coil 24.

The voice coil 24 is arranged in a rectangular tube shape as a whole, including a coil arranged around its axial direction, as is conventional.

The speaker frame 28 is generally rectangular having a size corresponding to that of the back plate 38. The speaker frame 28 includes four legs 48 secured to the back plate 38 as shown in FIG. 1. The speaker frame 28 is around the periphery of the main magnet 32 to define a space 49 for receiving the voice coil 24.

In the illustrated embodiment, the spacing between front and rear faces 50 and 52 of the speaker frame 28 is the same as that between the front and rear surfaces 44 and 46 of the voice coil 24. The side of the front suspension component 40 and the rear suspension component 42 facing the voice coil 24 are fixedly connected with the front and rear faces 50 and 52 of the speaker frame 28. This renders the support of the suspension component 26 to the voice coil 24 more stable, and will not produce additional force on the voice coil 24 except under the action of magnetic field, so as to ensure the stability of acoustic performance of loudspeaker.

Figure 5:
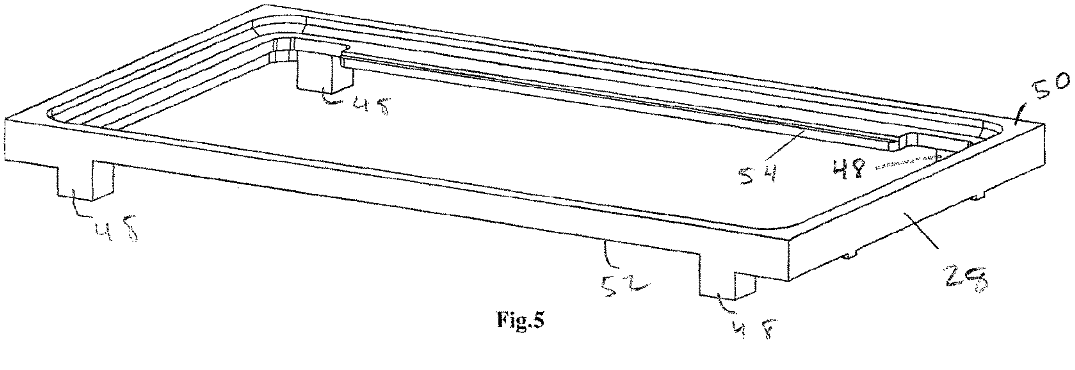
FIG. 5 is a perspective view of a speaker frame of the micro loudspeaker of FIG. 1.
Figure 6:
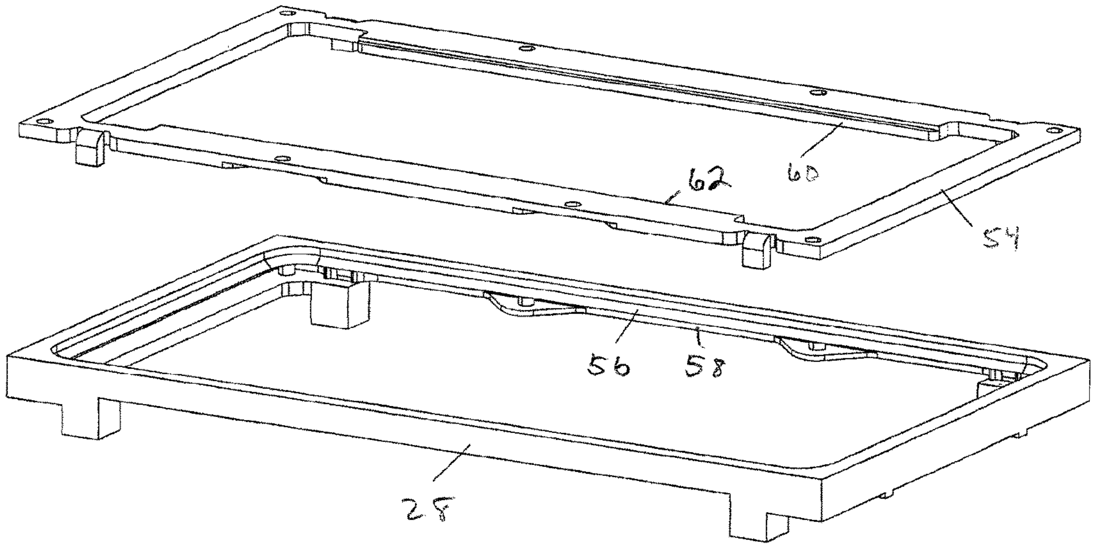
FIG. 6 is a perspective view of a front plate of the micro loudspeaker of FIG. 1.

In the illustrated embodiment of the invention, as shown in FIGS. 5 and 6, a front plate 54 is arranged on the speaker frame 28. The front plate 54 is embedded in a ring groove 56, see FIG. 6, arranged in the middle of an inner wall 58 of the speaker frame 28. The front plate 54 is provided with opposite pressing plates 60 and 62 protruding inwardly corresponding to position of the respective sub magnets 34 and 36. The pressing plates 60 and 62 are fixedly connected with the upper surfaces of the sub magnets 34 and 36 facing the diaphragm assembly 22. The speaker frame 28 and the front plate 54 may be formed of plastic or iron, or the like.

The front suspension component 40 includes an outer ring frame 64 and an inner ring frame 66 connected by four front elastic arms 68, one on each side, arranged on the same horizontal plane. The outer ring frame 64 and the inner ring frame 66 are respectively arranged corresponding to the speaker frame 28 and the voice coil 24 and are fixedly connected through the front elastic arms 68.

The rear suspension component 42 is symmetrically arranged as two identical parts, namely a first suspension element 70 and a second suspension element 72, one each on both ends of the voice coil 24. Each suspension element 70 and 72 comprises an outer support plate 74, an inner support plate 76 and a pair of rear elastic arms 78 at each end arranged in the same horizontal plane. The outer support plate 74 and the inner support plate 76 are respectively arranged corresponding to the speaker frame 28 and the voice coil 24 and fixedly connected through the rear elastic arms 78. The outer ring frame 64 and the outer support plate 74 are respectively bonded to the front and rear faces 50 and 52 of the speaker frame 28, and the inner ring frame 66 and the inner support plate 76 are respectively bonded to the front and rear surfaces 44 and 46 of the voice coil 24.

The front suspension component 40 is arranged between the diaphragm assembly 22 and the voice coil 24, and its two sides are fixedly connected with the diaphragm assembly 22 and the voice coil 24. The rear suspension component 42 is fixed at opposite ends of the voice coil 24 towards the back plate 38.

Figure 9:
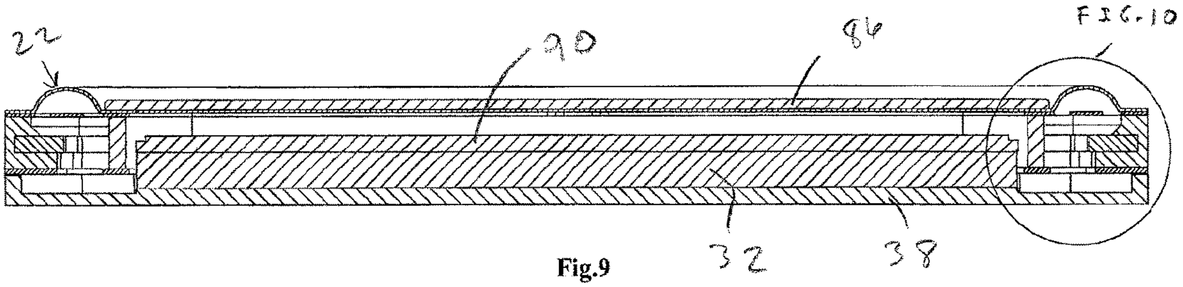
FIG. 9 is a section view of the loudspeaker taken along the line 9-9 in FIG. 1.
Figure 10:
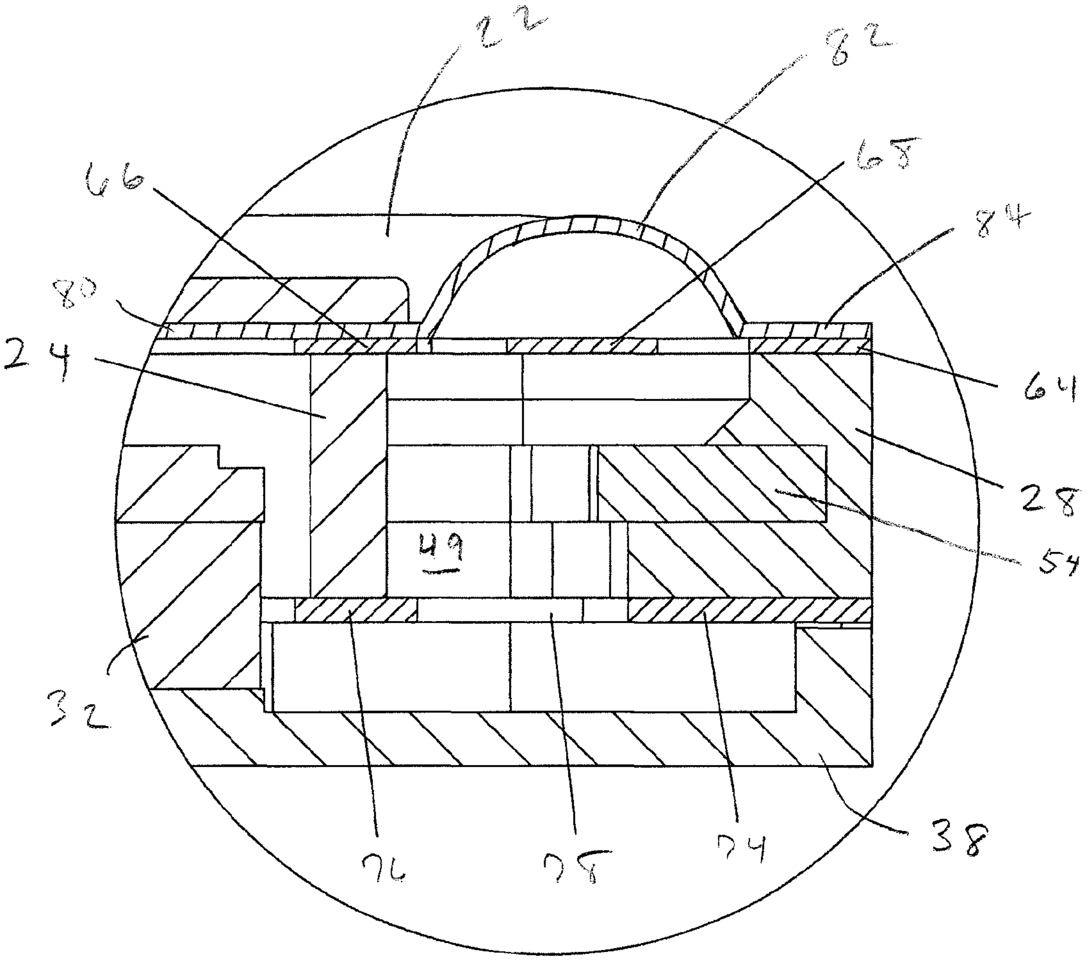
FIG. 10 is an enlarged view of the local structure at 10 in FIG. 9.

As also shown in FIGS. 9 and 10, the front suspension component 40 and the rear suspension component 42 are respectively fixedly secured on the front and rear faces 50 and 52 of the speaker frame 28 through the outer ring frame 64 and the outer support plate 74 arranged on the outside. Here, the securing can be fixed with double-sided adhesive or liquid adhesive. The inner ring frame 66 of the front suspension component 40 provides upward tension to the front surface 44 of the voice coil 24, and the inner support plate 76 of the rear suspension component 42 provides upward support to the rear surface 46 of the voice coil 24. The inner ring frame 66 and the inner support plate 76 are connected with the outer ring frame 64 and the outer support plate 74 fixed on the speaker frame 28 through the front elastic arms 68 and the rear elastic arms 78 respectively, and the setting of the elastic arms will not affect the voice coil 24 to push the diaphragm assembly 22 to vibrate.

In the illustrated embodiment of the invention, the diaphragm assembly 22 is fixed on the front suspension component 40. The diaphragm assembly 22 includes a diaphragm or dome 80 in the middle part, a folding ring 82 arranged around the dome 80, and an outer flange 84 arranged around the folding ring 82. The folding ring 82 is located above the first elastic arm 68, and the parts of the dome 80 and the outer flange 84 close to the folding ring 82 are fixedly connected with the inner ring frame 66 and the outer ring frame 64, respectively. The diaphragm assembly 22 may be formed of paper, polyetherimide, or the like, as is conventional.

Figure 7:
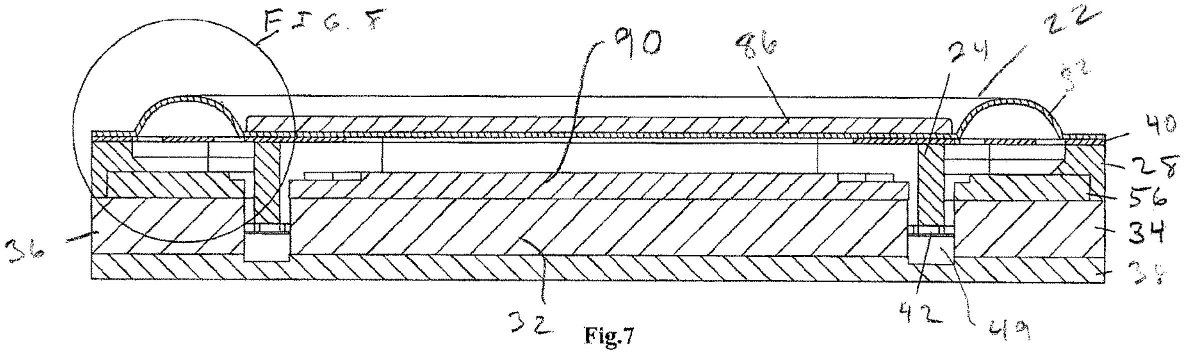
FIG. 7 is a section view of the loudspeaker taken along the line 7-7 in FIG. 1.
Figure 8:
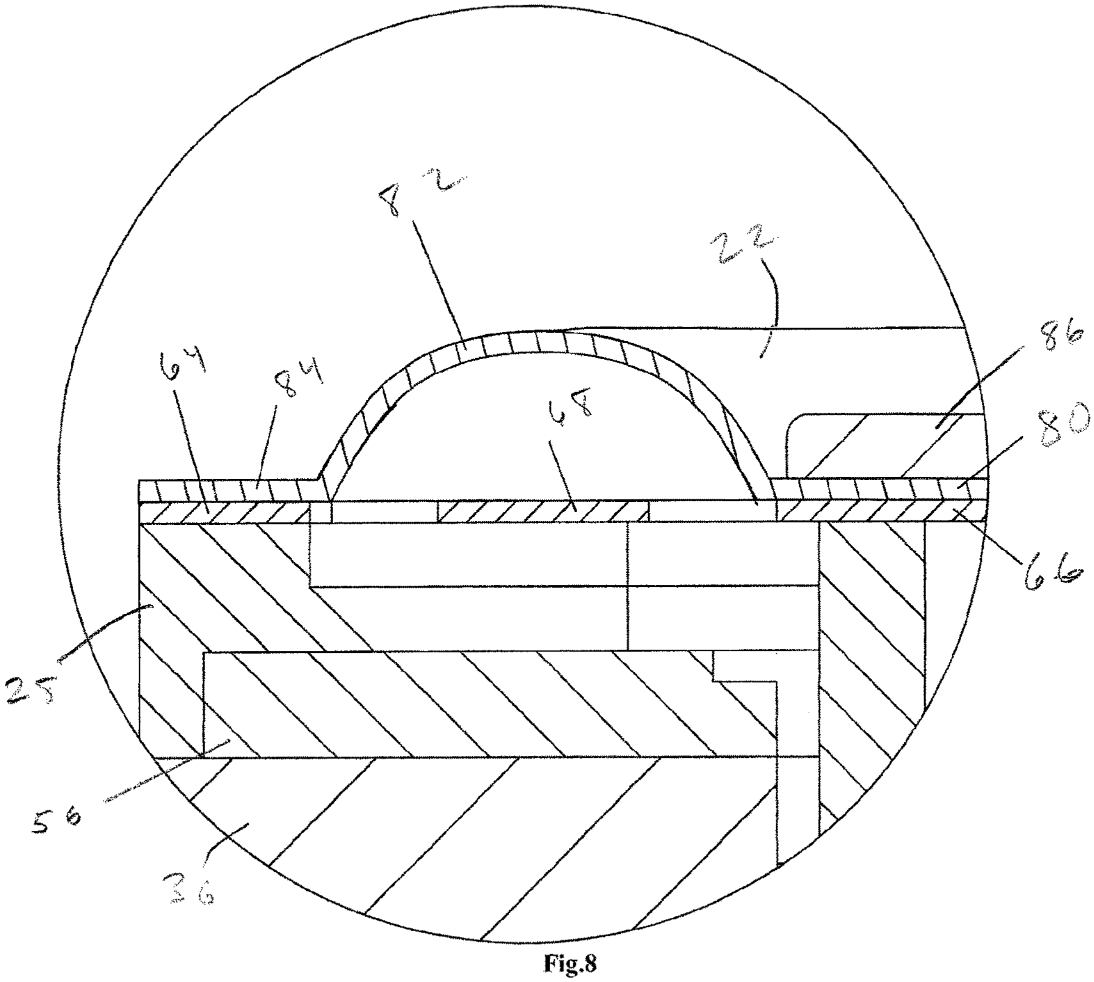
FIG. 8 is an enlarged view of the local structure at 8 in FIG. 7.

In the illustrated embodiment of the invention, as shown in FIGS. 7 and 8, the diaphragm assembly 22 also includes a middle paste 86 arranged on the dome 80. The setting of the middle paste 86 reduces its weight on the premise of ensuring its rigidity, which can further improve the high-frequency response of the loudspeaker. The light-weight middle paste 86 ensures the high sound pressure of the diaphragm assembly 22.

The voice coil 24 is arranged in a rectangular tube as a whole, including a coil arranged around it along its axial direction, as is conventional. Under the action of the magnetic field, it vibrates by changing its force in the magnetic field through the changing electrical signal. In this application, the hollow part at one end of the voice coil 24 close to the back plate 38 is sleeved on the main magnet 32, and there is a certain vibration space between the upper surface of the main magnet 32 and the diaphragm assembly 22. Further, the main magnet 32 is arranged in a circular rectangular shape corresponding to the voice coil 24, the sub magnets 34 and 36 are symmetrically arranged on both sides of the long side of the main magnet 32, and the two suspension components 40 and 42 are symmetrically arranged on both sides of the short end of the main magnet 32. Through this arrangement, it can not only ensure the distribution of the magnetic field, but also reduce the occupation of space, strengthen the fixation of the sub magnets 34 and 36 and avoid the movement interference with the rear suspension component 42, to ensure the vibration stroke of diaphragm assembly 22. A pole piece 90 may be provided on an upper surface of the main magnet 32.

Thus, as described, a high amplitude micro loudspeaker 20 comprises the magnet circuit 30, comprised by the main magnet 32, and possible sub magnets 34 and 36 of a select size and shape mounted to the back plate 38. The voice coil 24 is of a size and shape to be sleeved within the magnet circuit 30. The speaker frame 28 is secured to the magnet circuit 30 around a periphery of the main magnet 32 to define a space therebetween for receiving the magnet circuit 30 and the voice coil 24. The front and rear suspension components 40 and 42 are secured to a front and back of the voice coil 24 and to a front and back of the speaker frame 28 whereby the voice coil 24 is supported so that it is suspended and sleeved within the magnet circuit 30. The diaphragm assembly 22 is secured to the front of the speaker frame 28 and the front of the voice coil 24.

Those skilled in the art will understand that the invention is not limited by the above embodiments. What is described in the above embodiments and specifications is only to explain the principle of the invention. On the premise of not departing from the spirit and scope of the invention, the invention will have various changes and improvements, which fall within the scope of the claimed invention. The scope of protection claimed by the invention is defined by the appended claims and their equivalents.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A high amplitude micro loudspeaker comprising:
- a magnet circuit comprising a magnet of a select size and shape mounted to a back plate;
- a voice coil of a size and shape to be sleeved about the magnet;
- a speaker frame operatively secured to the back plate around a periphery of the magnet to define a space therebetween for receiving the voice coil;
- front and rear suspension components respectively secured to a front and rear of the voice coil and to a front and rear of the speaker frame whereby the voice coil is supported so that it is suspended and sleeved about the magnet; and
- a diaphragm assembly operatively secured to the front of the speaker frame and the front of the voice coil.

2. The high amplitude micro loudspeaker according to claim 1, wherein the front and rear suspension components are arranged in parallel, and the front and rear suspension components are fixedly connected with both ends of the voice coil.

3. The high amplitude micro loudspeaker according to claim 2, wherein the front suspension component is disposed between the diaphragm assembly and the voice coil, and the front suspension component comprises two sides fixedly connected with the diaphragm assembly and a front side of the voice coil, and the rear suspension component is fixedly connected with a rear side of the voice coil towards the back plate.

4. The high amplitude micro loudspeaker according to claim 2, wherein depth of the speaker frame is the same as depth of the voice coil, and wherein the front and rear suspension components are fixedly connected with front and rear sides of the speaker frame.

5. The high amplitude micro loudspeaker according to claim 4, wherein the diaphragm assembly comprises a diaphragm in a middle part, a folding ring arranged around the dome, and an outer diaphragm ring arranged around the folding ring, and wherein the diaphragm assembly is fixedly connected to the front suspension component and the folding ring is located above the front suspension arms, and the diaphragm and the outer diaphragm ring are respectively connected to the inner ring frame and the outer ring frame.

6. The high amplitude micro loudspeaker according to claim 5, wherein the diaphragm assembly comprises a middle sticker arranged on the diaphragm.

7. The high amplitude micro loudspeaker according to claim 4, further comprising a front plate embedded in a ring groove opened in an inner wall of the speaker frame, and wherein the front plate is provided with a pressing plate along each side corresponding to the first and second sub magnets, and the pressing plates are fixedly connected with the side of the sub magnets facing the diaphragm assembly.

8. The high amplitude micro loudspeaker according to claim 1, wherein the front suspension component comprises an outer ring frame, an inner ring frame and front suspension arms connected between the outer ring frame and the inner ring frame and are arranged on the same horizontal plane, and wherein the outer ring frame and the inner ring frame are respectively arranged corresponding to the speaker frame and the voice coil.

9. The high amplitude micro loudspeaker according to claim 8, wherein the rear suspension components comprise first and second suspension elements symmetrically arranged on opposite ends of the voice coil, and wherein each of the first and second suspension elements comprises an outer support plate, an inner support plate and rear suspension arms connected between the outer support plate and the inner support plate and which are arranged in the same horizontal plane, and wherein the outer support plate and the inner support plate are respectively arranged corresponding to the speaker frame and the voice coil.

10. The high amplitude micro loudspeaker according to claim 9, wherein the outer ring frame and the outer support plate are respectively secured to front and rear surfaces of the speaker frame, and wherein the inner ring frame and the first and second suspension element inner support plates are secured to the rear surface of the voice coil.

11. The high amplitude micro loudspeaker according to claim 9, wherein the magnet comprises a main magnet of a generally rectangular shape corresponding to the voice coil, and wherein the magnet circuit further comprises first and second sub magnets symmetrically arranged on both sides of the main magnet, and the first and second suspension elements are symmetrically arranged on opposite short ends of the main magnet.

12. The high amplitude micro loudspeaker according to claim 1, wherein the magnet comprises a main magnet of a generally rectangular shape corresponding to the voice coil, and wherein the magnet circuit further comprises first and second sub magnets symmetrically arranged on both sides of the main magnet.

13. The high amplitude micro loudspeaker according to claim 1, wherein the voice coil is arranged in a rectangular tube shape as a whole.

14. A high amplitude micro loudspeaker comprising:
- a back plate;
- a magnet mounted to the back plate;
- a speaker frame operatively secured to the back plate around a periphery of the magnet to define a space therebetween;
- a voice coil disposed in the space between the magnet and the speaker frame;
- front and rear suspension components respectively secured to a front and rear of the voice coil and to a front and rear of the speaker frame whereby the voice coil is supported so that it is suspended and sleeved about the magnet; and
- a diaphragm assembly comprising a dome surrounded by a folding ring having an outer flange, wherein the outer flange is operatively secured to the front of the speaker frame and the dome is operatively connected to the front of the voice coil.

15. The high amplitude micro loudspeaker according to claim 14, wherein the front and rear suspension components are arranged in parallel, and the front and rear suspension components are fixedly connected with both ends of the voice coil.

16. The high amplitude micro loudspeaker according to claim 15, wherein the front suspension component is disposed between the diaphragm assembly and the voice coil, and the front suspension component comprises two sides fixedly connected with the diaphragm assembly and a front side of the voice coil, and the rear suspension component is fixedly connected with a rear side of the voice coil towards the back plate.

17. The high amplitude micro loudspeaker according to claim 14, wherein the front suspension component comprises an outer ring frame, an inner ring frame and front suspension arms connected between the outer ring frame and the inner ring frame and are arranged on the same horizontal plane, and wherein the outer ring frame and the inner ring frame are respectively arranged corresponding to the speaker frame and the voice coil.

18. The high amplitude micro loudspeaker according to claim 17, wherein the rear suspension components comprise first and second suspension elements symmetrically arranged on opposite ends of the voice coil, and wherein each of the first and second suspension elements comprises an outer support plate, an inner support plate and rear suspension arms connected between the outer support plate and the inner support plate and which are arranged in the same horizontal plane, and wherein the outer support plate and the inner support plate are respectively arranged corresponding to the speaker frame and the voice coil.

19. The high amplitude micro loudspeaker according to claim 18, wherein the outer ring frame and the outer support plate are respectively secured to front and rear surfaces of the speaker frame, and wherein the inner ring frame and the first and second suspension element inner support plates are secured to the rear surface of the voice coil.

* * * * *